(12) United States Patent
Peng et al.

(10) Patent No.: US 7,308,166 B1
(45) Date of Patent: Dec. 11, 2007

(54) COUPLING A LIGHT SENSOR ARRAY WITH AN OPTICAL COMPONENT

(75) Inventors: Yihlih Peng, Arcadia, CA (US); James A. Pinyan, Calabasas, CA (US)

(73) Assignee: Kotura, Inc., Monterey Park, CA (US)

( * ) Notice: Subject to any disclaimer, the term of this patent is extended or adjusted under 35 U.S.C. 154(b) by 323 days.

(21) Appl. No.: 10/267,812

(22) Filed: Oct. 8, 2002

(51) Int. Cl.
*G02B 6/12* (2006.01)
(52) U.S. Cl. .................................. 385/14; 385/15
(58) Field of Classification Search ................ 385/14, 385/15, 37, 39, 51, 92, 94; 356/326, 328; 398/84, 87; 362/551
See application file for complete search history.

(56) References Cited

U.S. PATENT DOCUMENTS

| | | | |
|---|---|---|---|
| 4,165,496 A | 8/1979 | Di Domeico et al. | |
| 4,558,920 A | 12/1985 | Newton et al. | |
| 4,836,645 A | 6/1989 | Leferve et al. | |
| 4,857,973 A | 8/1989 | Yang et al. | |
| 4,889,690 A * | 12/1989 | Opitz et al. ................ | 422/73 |
| 4,912,523 A | 3/1990 | Refi et al. | |
| 4,995,689 A | 2/1991 | Sarraf | |
| 5,140,149 A | 8/1992 | Sakata et al. | |
| 5,179,609 A * | 1/1993 | Blonder et al. ............. | 385/89 |
| 5,182,787 A | 1/1993 | Blonder et al. | |
| 5,221,984 A * | 6/1993 | Furuyama et al. .......... | 398/161 |
| 5,249,245 A * | 9/1993 | Lebby et al. ............... | 385/89 |
| 5,263,111 A | 11/1993 | Nurse et al. | |
| 5,333,216 A | 7/1994 | Sakata et al. | |
| 5,347,601 A | 9/1994 | Ade et al. | |
| 5,391,839 A | 2/1995 | Ade et al. | |
| 5,435,734 A * | 7/1995 | Chow ......................... | 439/69 |
| 5,511,142 A | 4/1996 | Horie et al. | |
| 5,517,589 A | 5/1996 | Takeuchi | |
| 5,600,741 A | 2/1997 | Hauer et al. | |
| 5,641,956 A | 6/1997 | Vengsarkar et al. | |
| 5,652,813 A | 7/1997 | Wilson | |
| 5,707,609 A * | 1/1998 | Mo ............................. | 424/40 |
| 5,764,832 A | 6/1998 | Tabuchi | |

(Continued)

FOREIGN PATENT DOCUMENTS

JP          404358105 A      12/1992

OTHER PUBLICATIONS

Lin et al., *Detector Array Packaging Technology for PLCs and its Application in WDM Subsystems*, 1999 IEEE. 65-68.

(Continued)

*Primary Examiner*—Jared J. Fureman
*Assistant Examiner*—Kumiko C. Koyama
(74) *Attorney, Agent, or Firm*—Gavrilovich, Dodd & Lindsey LLP

(57) ABSTRACT

An optical component system includes an optical component having a plurality of ports through which light signals exit the optical component. The system also includes a light sensor array having a plurality of light sensors. The light sensor array is coupled to the optical component such that different light sensors receive light signals that exit the optical component through different ports. The system also includes a light barrier positioned between the optical component and the light sensor array and between adjacent light sensors. In some instances, the light barrier is one of a plurality of light barriers that are each positioned between adjacent light sensors.

41 Claims, 12 Drawing Sheets

U.S. PATENT DOCUMENTS

| | | | |
|---|---|---|---|
| 5,786,925 A | 7/1998 | Goossen et al. | |
| 5,835,458 A | 11/1998 | Bischel et al. | |
| 5,910,012 A | 6/1999 | Takeuchi | |
| 5,988,842 A * | 11/1999 | Johnsen et al. | 362/551 |
| 6,005,995 A * | 12/1999 | Chen et al. | 385/24 |
| 6,027,255 A | 2/2000 | Joo et al. | |
| 6,081,639 A | 6/2000 | Kagami et al. | |
| 6,108,472 A | 8/2000 | Rickman et al. | |
| 6,169,825 B1 | 1/2001 | Morey et al. | |
| 6,275,628 B1 | 8/2001 | Jones et al. | |
| 6,316,281 B1 | 11/2001 | Lee et al. | |
| 6,393,172 B1 | 5/2002 | Brinkman et al. | |
| 6,393,183 B1 * | 5/2002 | Worley | 385/39 |
| 6,406,196 B1 | 6/2002 | Uno et al. | |
| 6,504,965 B2 * | 1/2003 | Paniccia et al. | 385/16 |
| 6,538,243 B1 * | 3/2003 | Bohn et al. | 250/208.1 |
| 6,567,585 B2 | 5/2003 | Harris | |
| 6,567,590 B1 | 5/2003 | Okada et al. | |
| 6,658,176 B2 | 12/2003 | Amantea | |
| 6,753,958 B2 * | 6/2004 | Berolo et al. | 356/328 |
| 6,826,331 B2 * | 11/2004 | Barwicz et al. | 385/37 |
| 2002/0044741 A1 | 4/2002 | Takeuchi et al. | |
| 2003/0227628 A1 * | 12/2003 | Kriemer et al. | 356/419 |

OTHER PUBLICATIONS

Van Der Linden, et al., *High-Density and Alignment-Tolerant Integration of Monitoring Photodetector Arrays onto Polymeric Guided-Wave Components*, IEEE Transactions on Advanced Packaging, vol. 22, No. 4, Nov. 1999, pp. 534-540.

Koren, et al., *A 1.3mm Wavelength Laser with an Integraed Output Power Monitor Using a Directional Coupler Optical Power Tap* IEEE Photon cs Technology Letters, vol. 8, No. 3, Mar. 1996, pp. 364-366.

Ohyama, et al., *8-Channel×2.5 Gbit/s Hybrid integrted Multiwavelength Phtoreceiver Module with Arrayed-Waveguide Grating Demultiplexer*, Electronics Letters, Apr. 25, 2002, vol. 38, No. 9, pp. 419-422.

Pennigs, et al., *Integrated-Optic ersus Microoptic Devices for Fiber-Optic Telecommunication Systems: A Comparison*, IEEE journal of Selected Topics in Quantum Electronics, vol. 2, No. 2, Jun. 1996, pp. 151-164.

* cited by examiner

COUPLING A LIGHT SENSOR ARRAY WITH AN OPTICAL COMPONENT

RELATED APPLICATIONS

This application is related to U.S. patent application Ser. No. 10/161,208, filed on May 31, 2002, entitled "Waveguide Tap Monitor" and incorporated herein in its entirety.

BACKGROUND

1. Field of the Invention

The invention relates to systems having light sensors coupled with an optical component. In particular, the invention relates to coupling a light sensor array to an optical component.

2. Background of the Invention

A variety of optical component systems include an optical component coupled with one or more light sensors. The optical components include one or more waveguides where light signals are constrained. These waveguides often terminate at a port through which light signals exit the optical component. The light sensor array is often coupled with the optical component so each light sensor receives light from one or more ports. As a result, each light sensor is generally associated with one or more ports on the optical component. Light can travel in the region between the light sensor array and the optical component. As a result, light from a particular port can enter this region and travel to an unassociated light sensor. Light that travels to an unassociated port is a source of cross talk. Because cross talk adversely affects the performance of the system, there is a need for a system having reduced cross talk.

SUMMARY OF THE INVENTION

The invention relates to an optical component system. The system includes an optical component having a plurality of ports through which light signals exit. The system also includes a light sensor array having a plurality of light sensors. The light sensor array is coupled to the optical component such that different light sensors receive light signals that exit the optical component through different ports. The system also includes a light barrier positioned between the optical component and the light sensor array and between adjacent light sensors. In some instances, the light barrier is one of a plurality of light barriers that are each positioned between adjacent light sensors.

In another embodiment of the system, the light barrier is positioned between the optical component and the light sensor array over a region of the optical component between adjacent ports.

In some instances, the light barrier is positioned in contact with a contact pad positioned on the optical component and a contact pad positioned on the light sensor array. The light barrier can electrically conductive. For instance, the light barrier can include a metal.

In some instances, a bonding medium is positioned adjacent to the light barrier. The bonding medium can serve to bond the optical component with the light sensor array. In some instances, the bonding medium is in contact with a contact pad positioned on the optical component and a contact pad positioned on the light sensor array. The bonding medium can electrically conductive.

In some instances, the ports are configured to direct the light signals such that the light signals exiting the optical component travel toward a location positioned over the optical component. The port can include a recess formed in the optical component. A solid light transmitting medium can be formed between the light signal array and bottom of the recess.

The invention also relates to a method of forming an optical component system. The method includes obtaining an optical component having a plurality of ports through which light signals exit the optical component. The method also includes obtaining a light sensor array including a plurality of light sensors. The array is coupled to the optical component such that different light sensors receive light signals that exit the optical component through different ports. The method further includes bonding the light sensor array and the optical component such that a light barrier is positioned between the optical component and the light sensor array and between adjacent light sensors.

DETAILED DESCRIPTION

The invention relates to an optical component system. The system includes an optical component having a plurality of ports through which light signals exit the optical component. The system also includes a light sensor array having a plurality of light sensors. The light sensor array is coupled to the optical component such that different light sensors receive light signals from different ports. As a result, each port is associated with a particular light sensor. The system also includes light barriers between the optical component and the light sensor array. The light barriers are positioned between adjacent light sensors. As a result, the light barriers can prevent a light signal exiting a particular port from traveling to an unassociated light sensor.

In some instances, the light barrier is positioned between an electrical contact pad on the optical component and an electrical contact pad on the light sensor array. The light barrier can be constructed of an electrically conducting material. As a result, the light barrier can also serve to provide electrical communication between the optical component and the light sensor array.

Figure 1A:
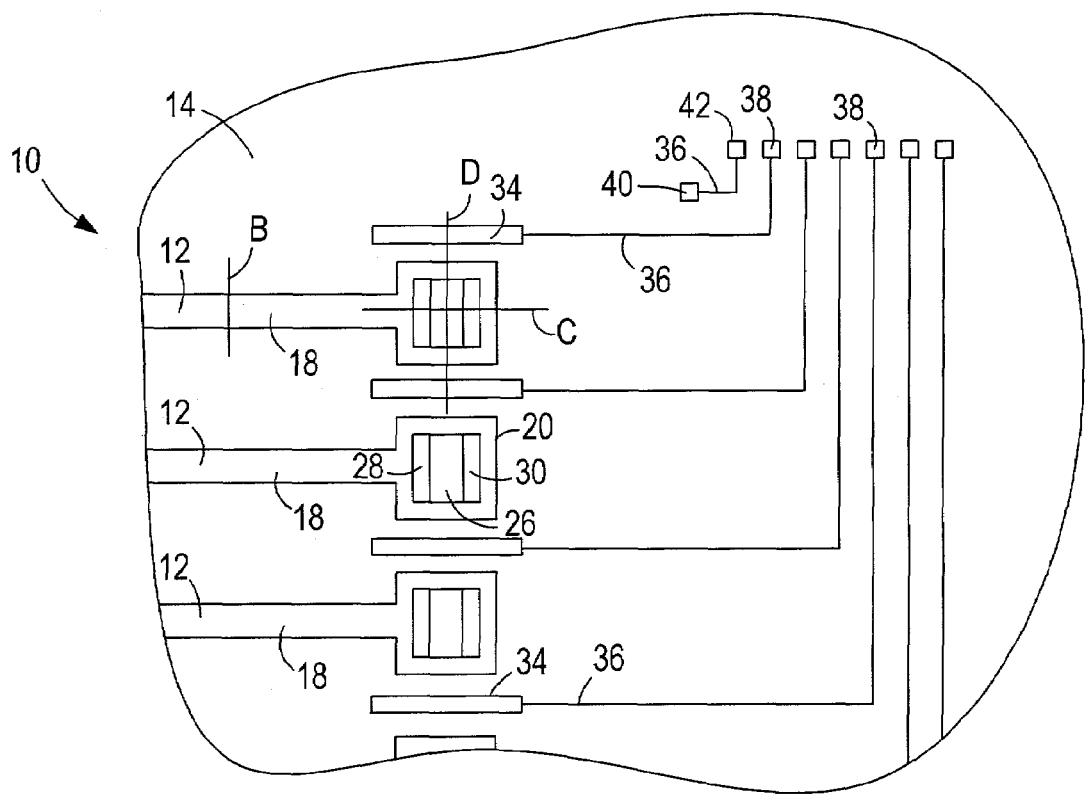
FIG. 1A is a topview of an optical component that is suitable for use with a light sensor array.
Figure 1B:
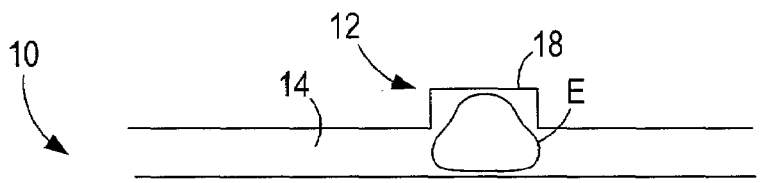
FIG. 1B is a cross section of the optical component taken at the line labeled B in FIG. 1A.
Figure 1C:
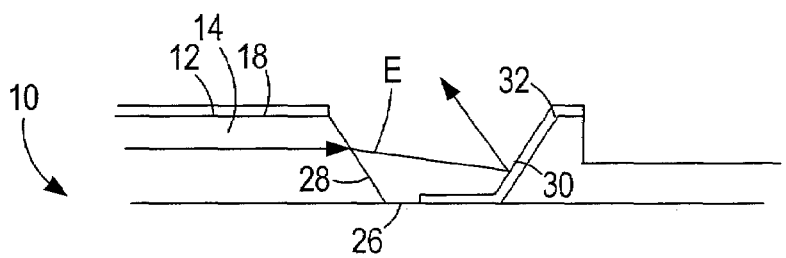
FIG. 1C is a cross section of the optical component taken at the line labeled C in FIG. 1A.
Figure 1D:
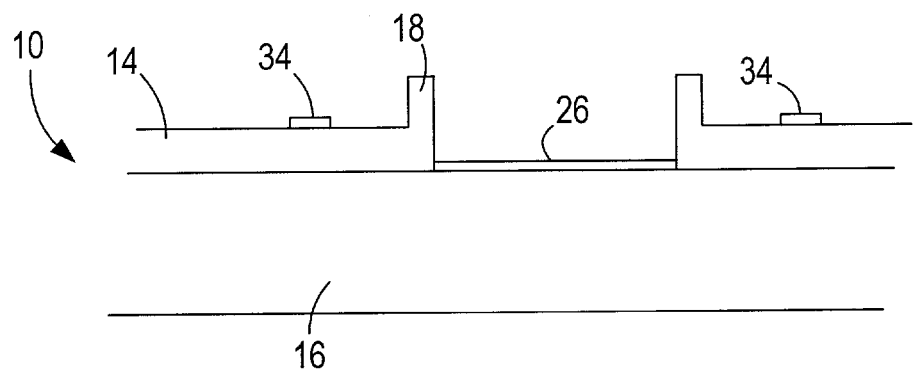
FIG. 1D is a cross section of the optical component taken at the line labeled D in FIG. 1A.

FIG. 1A through FIG. 1D illustrate an optical component 10 that is suitable for use with a light sensor array 50. FIG. 1A is a topview of the optical component 10. FIG. 1B is a cross section of the optical component 10 taken at the line labeled B and FIG. 1C is a cross section of the optical component 10 taken at the line labeled C. FIG. 1D is a cross section of the optical component 10 taken at the line labeled D.

The optical component 10 includes waveguides 12 defined in a first light transmitting medium 14 positioned on a base 16. The first light transmitting medium 14 includes a ridge 18 that defines an upper portion of the waveguides 12. Suitable light transmitting media include, but are not limited to, silicon, polymers, silica, SIN, GaAs, InP and LiNbO$_3$. The portion of the base 16 adjacent to the first light transmitting medium 14 reflects light signals from the waveguides 12 back into the waveguides 12. As a result, the base 16 defines a lower portion of the waveguides 12. The line labeled E in FIG. 1B illustrates the mode profile of a light signal carried in a waveguide 12.

The optical component 10 includes a plurality of ports 20 through which light signal exit the optical component 10. Each port 20 includes a recess having one or more sides. The illustrated embodiment includes a bottom side 26 and a plurality of lateral sides including a leading side 28 and a following side 30.

FIG. 1C illustrates operation of a port 20. A light signal traveling along a waveguide 12 is transmitted through the leading side 28 of the port 20 as illustrated by the arrow labeled E. The port 20 is constructed so one or more sides receive the light signal. In some instances, the port 20 is constructed to refract the tapped portion toward one or more of the sides. The following side 30 is illustrated as receiving the light signal. One or more of the sides receiving the light signal are constructed to reflect the lights signal such that the light signal travels away from the optical component 10. Accordingly, the port 20 redirects the light signal such that the light signal travels away from the base 16. Further, when a plane is defined by the direction of propagation of the light signal along the waveguides 12, the port 20 redirects the tapped portion of the light signal such that that the tapped portion of the light signal travels out of the plane. Additional details regarding the construction of the port 20 are provided in U.S. patent application Ser. No. 10/161,208, filed on May 31, 2002 and entitled "Waveguide 12 Tap Monitor."

FIG. 1C shows a reflecting layer 32 positioned on portions of the first light transmitting medium 14. The reflecting layer 32 is selected to reflect incident light. The reflecting layer 32 is formed on bottom of the recess and on the following side 30 but is not formed on the leading side 28. As a result, the reflecting layer 32 permits the light signal to be transmitted through the leading side 28 while being reflected off the bottom of the recess and the following side 30. A suitable reflecting layer 32 includes, but is not limited to, metals such as aluminum. Although the reflecting layer 32 is illustrated in FIG. 1A through FIG. 1D, the reflecting layer 32 is optional in many instances.

The optical component 10 includes a plurality of electrical contact pads. A first component pad 34 is positioned adjacent to each port 20. Conductors 36 provide electrical communication between each first component pad 34 and a second component pad 38. Conductors 36 also provide electrical communication between a first common component pad 40 and a second common component pad 42.

Figure 1E:
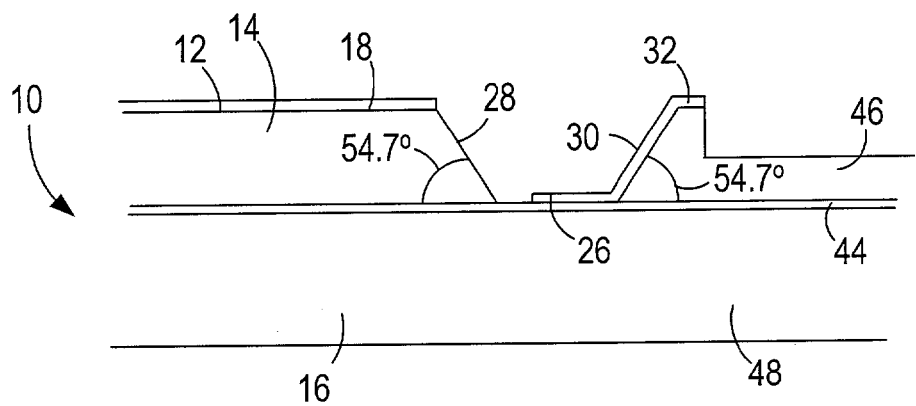
FIG. 1E is a particular example of an optical component constructed on a silicon-on-insulator wafer.

FIG. 1E is a cross section of an optical component 10 and shows a particular optical component 10 construction. The illustrated optical component 10 is constructed on a silicon-on-insulator wafer. A silicon-on-insulator wafer typically includes a silica layer 44, positioned between a silicon layer 46 and a silicon substrate 48. The silicon layer 46 serves as the first light transmitting medium 14. The silica layer 44 and the silicon substrate 48 serve as the base 16. The silica layer 44 serves as a light barrier 58 that reflects light signals from the first light transmitting medium 14 back into the first light transmitting medium 14. An aluminum reflecting layer 32 is positioned on at least the bottom side 26 and on the following side 30. The port 20 can be etched into the silicon layer 46. The crystalline structure of the silicon layer 46 causes the leading side 28 and the following side 30 to be naturally formed at an angle of about 54.7° measured relative to the silica layer 44.

Figure 2A:
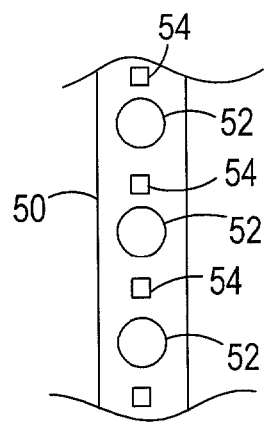
FIG. 2A is a bottom view of a light sensor array including a plurality of light sensors.
Figure 2B:
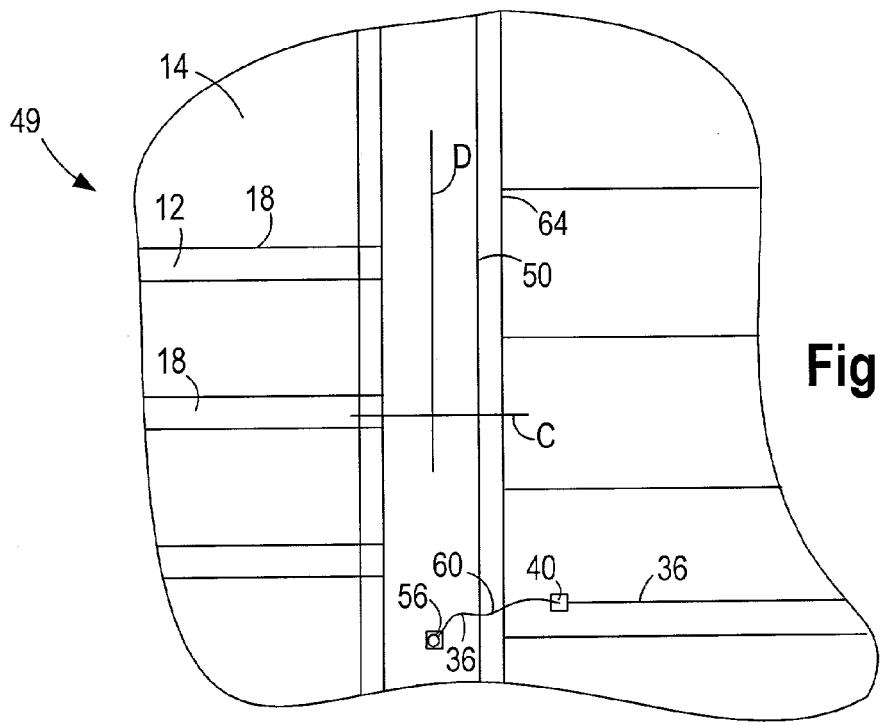
FIG. 2B is a topview of an optical component system including the light sensor array of FIG. 2B coupled with an optical component. A light barrier is positioned adjacent to a region of the light sensor array between adjacent light sensors.
Figure 2C:
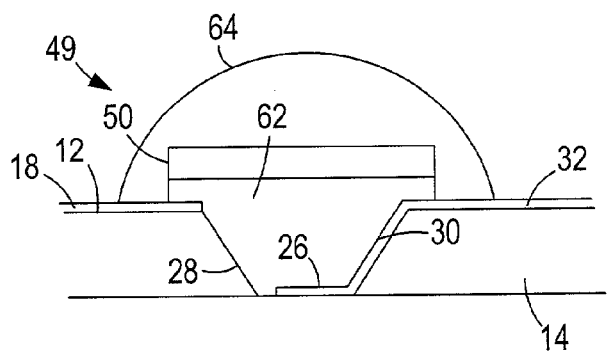
FIG. 2C is a cross section of the optical component system taken along the line labeled C in FIG. 2B.
Figure 2D:
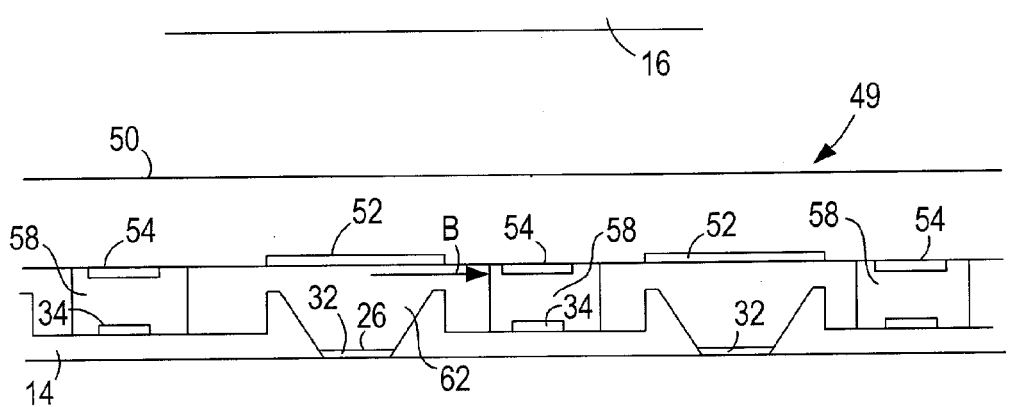
FIG. 2D is a cross section of the optical component system taken along the line labeled D in FIG. 2B.
Figure 2E:
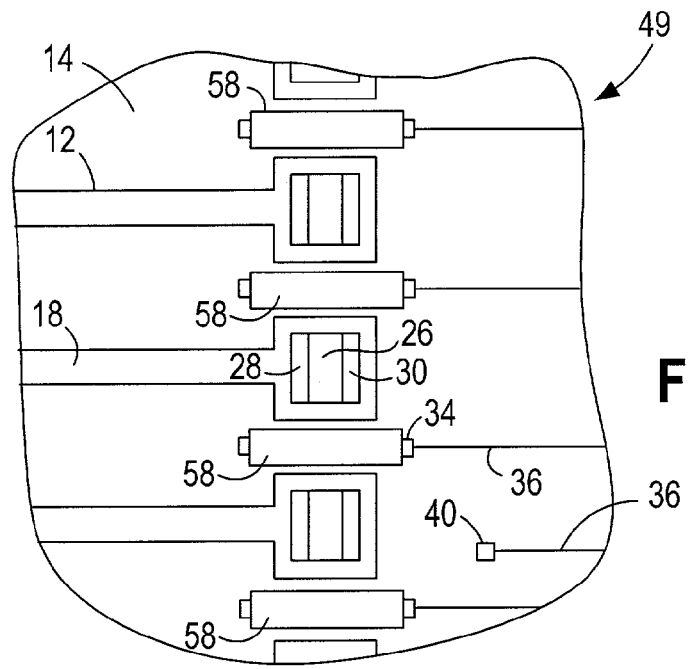
FIG. 2E is a topview of the optical component system shown in FIG. 2B without the light sensor array illustrated in FIG. 2B.

FIG. 2A through FIG. 2E illustrate an optical component system 49 having a light sensor array 50 coupled with an optical component 10. FIG. 2A is a bottom view of a light sensor array 50. FIG. 2B is a topview of the optical component system 49 including the light sensor array 50 of FIG. 2B coupled with an optical component 10. FIG. 2C is a cross section of the optical component system 49 shown in FIG. 2B taken along the line labeled C. FIG. 2D is a cross section of the optical component system 49 shown in FIG. 2B taken along the line labeled D. FIG. 2E is a topview of the optical component system 49 shown in FIG. 2B with the light sensor array 50 removed from FIG. 2B.

The light sensor array 50 includes a plurality of light sensors 52. A suitable light sensor 52 outputs an electrical signal in response to receiving a light signal. Examples of a suitable light sensor 52 include, but are not limited to, a photodetectors, photodiodes, avalanche photodiodes, charge coupled devices (CCDs), and photomultiplier tubes. The light sensor array 50 includes a plurality of electrical contact pads. Each light sensor 52 is in electrical communication with a first array pad 54 positioned adjacent to the light sensor 52. Each light sensor 52 is also in electrical communication with a common array pad 56 positioned on the top side of the light sensor array 50. Suitable light sensor arrays are available from suppliers such as OSI Fibercomm, Inc., Ferminoics and Sensors Unlimited.

The light sensor array 50 is coupled with the optical component 10 so each light sensor 52 is positioned to receive the light signals that exit from a particular port 20 of the optical component 10. Accordingly, each light sensor 52 is associated with a particular port 20 on the optical component 10.

Light barriers 58 are positioned between the optical component 10 and the light sensor array 50. At least one light barrier 58 is positioned adjacent to a region of the optical component 10 between ports 20. Additionally, one or more of the light barriers 58 are positioned adjacent to a region of the optical component 10 between light sensors 52. Suitable light barriers 58 are selected to absorb and/or reflect an incident light signal. As a result, the position of the light barriers 58 serves to reduce cross talk. For instance, the light barriers 58 can prevent a light signal from the port 20 labeled A from entering the light sensor 52 labeled B as shown by the arrow labeled B in FIG. 2D. Suitable light barriers 58 include, but are not limited to, opaque materials such as metals, plastics, solder, carbon and ceramics. In some instances, a low transmission material can serve as the light barrier 58. For instance, materials transmitting less than 10% of 1550 nm light, less than 5% of 1550 nm light, 1% of 1550 nm light, 0.5% of 1550 nm light or 0.0% of 1550 nm light can serves as a suitable light barrier 58. Epoxies are an example of materials that can have different light transmission characteristics.

As shown in FIG. 2D, a light barrier 58 can be positioned in contact with a first component pad 34 and a first array pad 54. The light barrier 58 can be constructed of an electrically conducting material that provides electrical communication between the first array pad 54 and the first component pad 34. Because each first array pad 54 is in electrical communication with a light sensor 52 and because each first component pad 34 is in electrical communication with a second component pad 38, the light barrier 58 can serve to complete the electrical communication between each light sensor 52 and a second component pad 38. A suitable light barrier 58 for providing electrical communication between a first array pad 54 and a first component pad 34 includes, but is not limited to, a metal such as gold.

A conductor 36 provides electrical communication between the common array pad 56 and the first common component pad 40. Because each light sensor 52 is in electrical communication with the common array pad 56 and because the first common component pad 40 is in electrical communication with a second common component pad 42, the conductor 36 serves to complete the electrical communication between each light sensor 52 and the second common component pad 42. A suitable conductor 36 for providing electrical communication between the common array pad 56 and the first common component pad 40 is a wire 60 that is wire bonded to the common array pad 56 and the first common component pad 40.

The second component pad 38 and the second common component pad 42 can each be coupled with electronics (not shown) for monitoring the light sensors 52. The electronics can monitor the output from a particular light sensor 52 by monitoring a circuit that includes that light sensor 52. Accordingly, the electronics can monitor the output from a particular light sensor 52 by monitoring a circuit completed through the second component pad 38 in electrical communication with that light sensor 52 and the second common pad.

A region between the light sensor array 50 and the optical component 10 can be filled with a second light transmitting medium 62. The second light transmitting medium 62 has a different index of refraction than the first light transmitting medium 14. The change in the index of refraction can cause refraction of light signals transmitted through the leading side 28 of a port 20. As a result, the second light transmitting medium 62 can be selected to have an index of refraction that provides a refraction angle. Suitable second light transmitting media include gasses such as air and solids such as epoxy and polymers.

A sealing medium 64 can be positioned over the light sensor array 50. Although the sealing medium need not be transparent, the sealing medium is illustrated as transparent in FIG. 2B for the purposes of illustration. In some instances, the sealing medium 64 encapsulates the light sensor array 50 on the optical component 10. The sealing medium 64 can be selected to provide a hermetic seal that reduces the influence of dust and other atmospheric affects on the performance of the optical component system 49. Additionally, the sealing medium 64 can enhance the bonding strength of the light sensor array to the optical component.

Figure 3A:
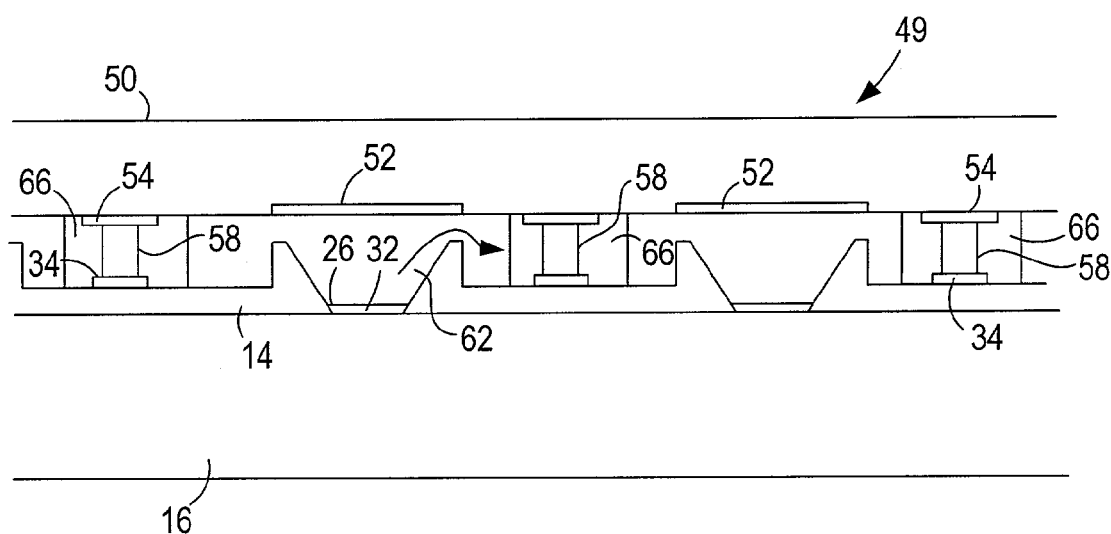
FIG. 3A is a cross section of an optical component system having a light sensor array coupled with an optical component. A light barrier and a bonding medium are positioned adjacent to a region of the light sensor array between adjacent light sensors.
Figure 3B:
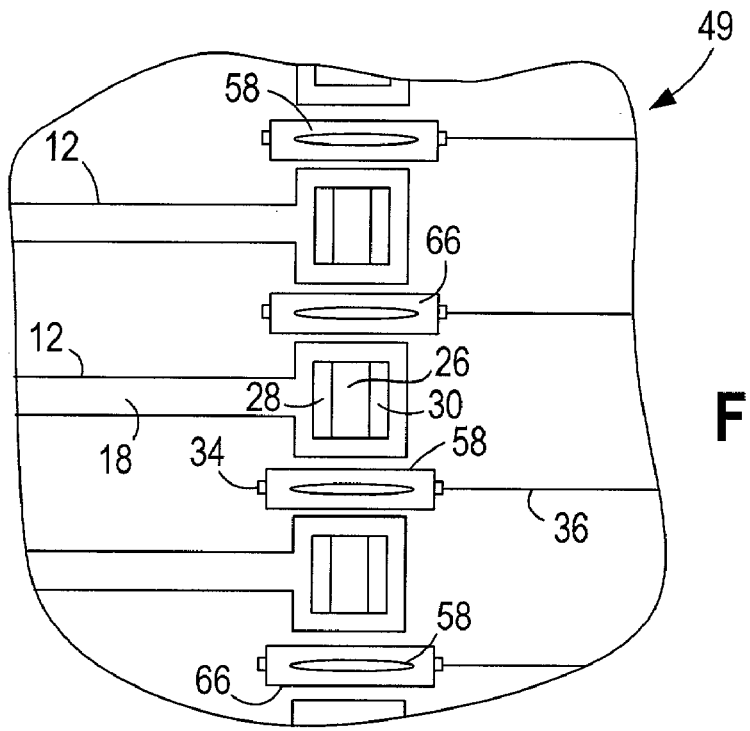
FIG. 3B is a topview of the optical component system shown in FIG. 3A without the light sensor array in place.

In some instances, the light barrier 58 is selected to bond the light sensor array 50 to the optical component 10. For instance, certain epoxies can serves as a light barrier 58 and can bond the light sensor array 50 to the optical component 10. Alternatively, the light barrier 58 can be employed in conjunction with a bonding medium 66 as illustrated in FIG. 3A and FIG. 3B. FIG. 3A is a cross section of an optical component system 49 having a light sensor array 50 coupled with an optical component 10. FIG. 3B is a topview of the optical component system 49 shown in FIG. 3A with the light sensor array 50 removed.

A bonding medium 66 is positioned adjacent to the light barrier 58. The bonding medium 66 bonds the light sensor array 50 to the optical component 10 while the light barrier 58 serves to reduce the cross talk. The bonding medium 66 can also serve as a light barrier 58. For instance, the bonding medium 66 can transmit a low port 20 of the light signals. As a result, the bonding medium 66 and the light barrier 58 can at together to provide more of a light barrier 58 than is provided by the light barrier 58 alone.

The light barrier 58 and the bonding medium 66 can both serve to provide electrical communication between a first component pad 34 and a first array pad 54. For instance, the light barrier 58 can be a metal such as gold and the bonding medium 66 can be an electrically conducting epoxy or solder. Although not shown, a layer of the bonding medium 66 can form between the light barrier 58 and the optical component 10 and/or between the light barrier 58 and the light sensor array 50. The use of an electrically conducting bonding medium 66 prevents these layers from disrupting the current flow from the first component pad 34 to the first array pad 54. Further, an electrically conducting bonding medium 66 can eliminate the need for an electrically conducting light barrier 58 because the boding medium can conduct current between the first component pad 34 and the first array pad 54.

In some instances, the bonding medium 66 is an electrical insulator and the light barrier 58 serves to provide electrical communication between a first component pad 34 and a first array pad 54. In these instances, the optical component system 49 can be arranged as illustrated in FIGS. 3A and 3B.

Figure 3C:
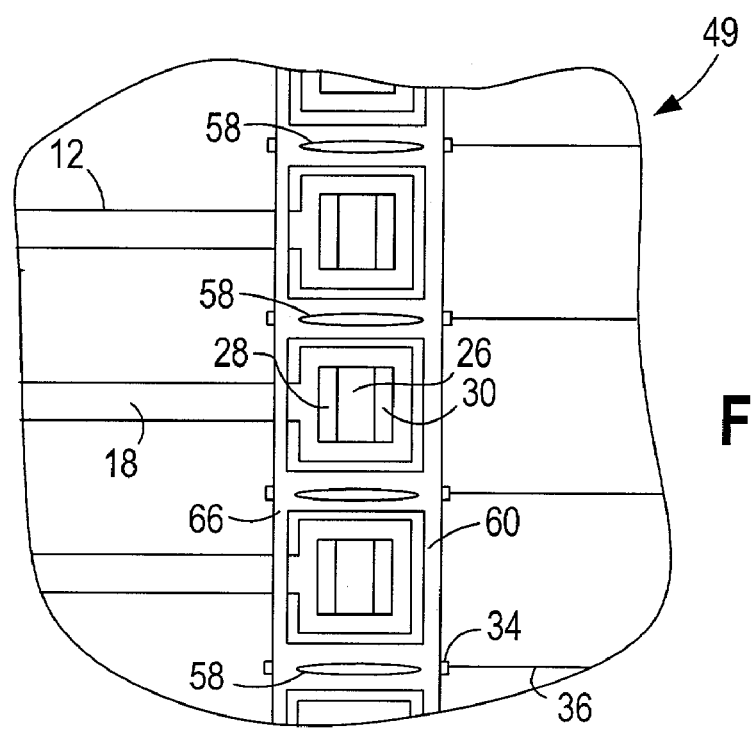
FIG. 3C is a topview of an optical component system without the light sensor array in place. Light barriers are positioned adjacent to a region of the light sensor array between adjacent light sensors. A bonding medium is positioned adjacent to the light barrier and surrounds a plurality of the sensors.

Alternatively, the optical component system 49 can be arranged as illustrated in FIG. 3C. FIG. 3C is a topview of an optical component system 49 with the light sensor array 50 removed. Light barriers 58 are positioned between adjacent ports 20 while the bonding medium 66 surrounds a plurality of the ports 20. Because the bonding medium 66 is an electrical insulator, the sensors remain electrically isolated.

In some instances, the bonding medium 66 is an electrical insulator and the light barrier 58 serves to provide electrical communication between a first component pad 34 and a first array pad 54. In these instances, the optical component system 49 can be arranged as illustrated in FIGS. 3A and 3B. Alternatively, the optical component system 49 can be arranged as illustrated in FIG. 3C. FIG. 3C is a topview of an optical component system 49 with the light sensor array 50 removed. Light barriers 58 are positioned between adjacent ports 20 while the bonding medium 66 surrounds a plurality of the ports 20. Because the bonding medium 66 is an electrical insulator, the sensors remain electrically isolated.

Figure 4A:
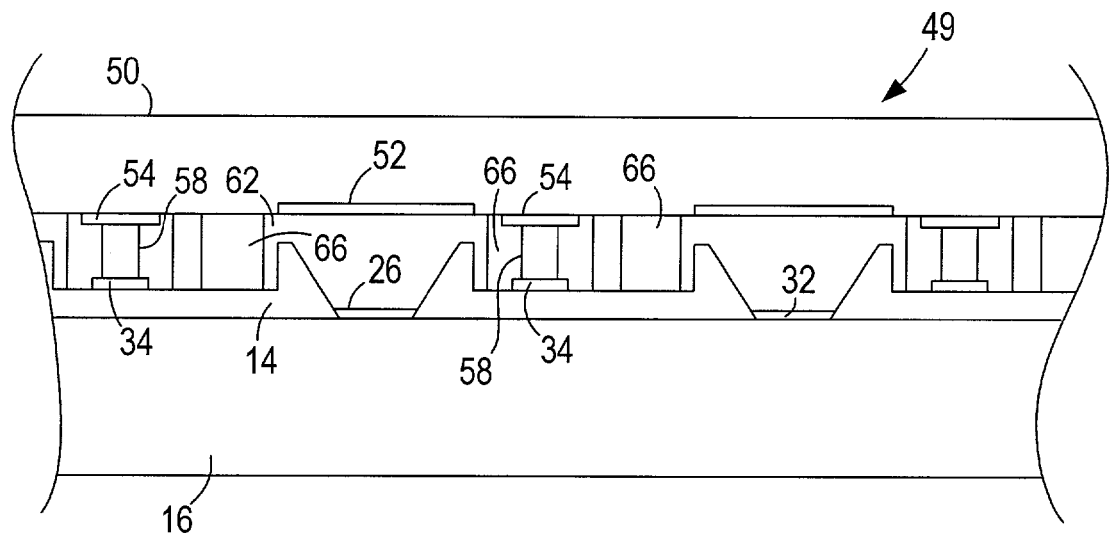
FIG. 4A is a cross section of an optical component system having a light sensor array coupled with an optical component.
Figure 4B:
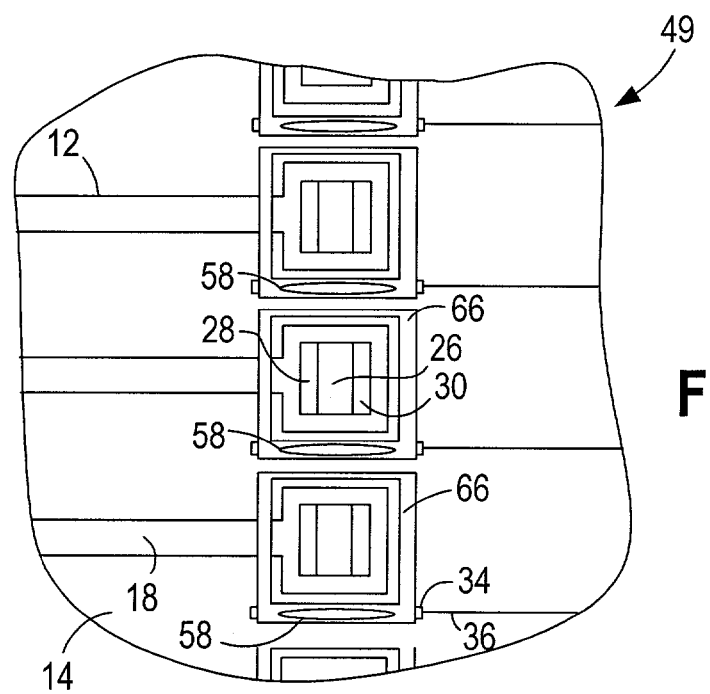
FIG. 4B is a topview of the optical component system shown in FIG. 4A without the light sensor array. A bonding medium surrounds a plurality of ports and light sensors. A gap formed between the bonding medium associated with adjacent light sensors serves to keep the adjacent sensors electrically isolated.

The bonding medium 66 can also surround the ports 20 when the bonding medium 66 is electrically conducting as shown in FIG. 4A and FIG. 4B. FIG. 4A is a cross section of an optical component system 49 having a light sensor array 50 coupled with an optical component 10. FIG. 4B is a topview of the optical component system 49 shown in FIG. 4A with the light sensor array 50 removed. The bonding medium 66 surrounds a plurality of ports 20 and light sensors 52. A gap formed between the bonding medium 66 associated with adjacent light sensors 52 serves to keep the adjacent sensors electrically isolated.

Figure 5A:
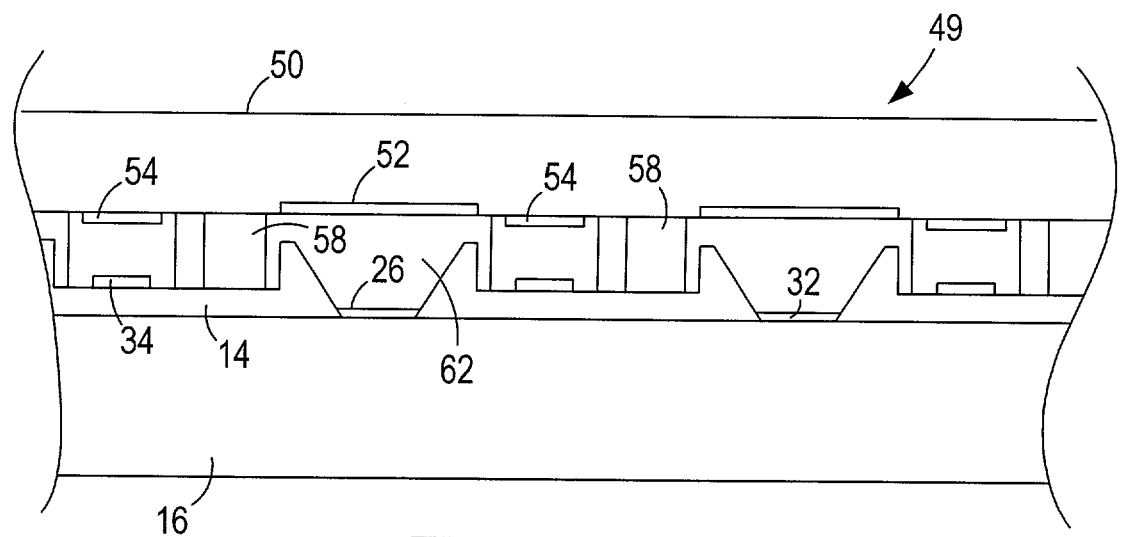
FIG. 5A is a cross section of an optical component system having a light sensor array coupled with an optical component.
Figure 5B:
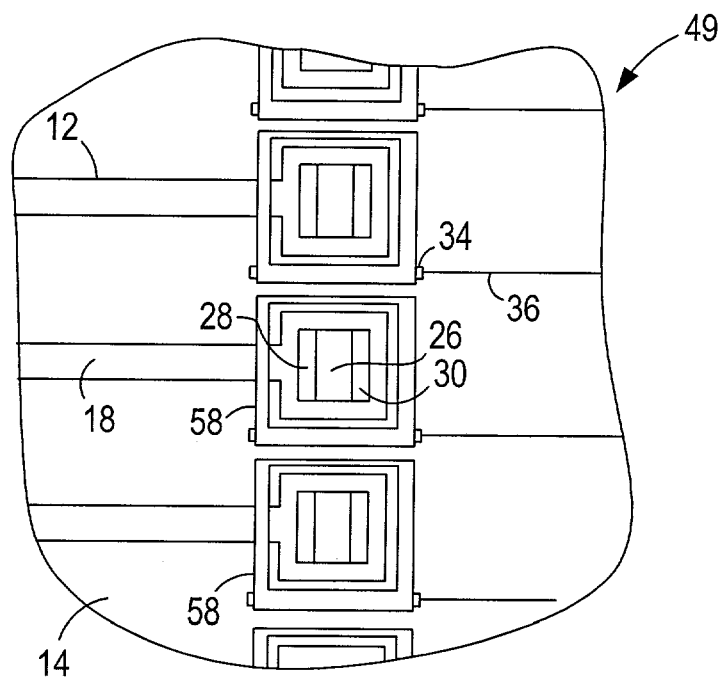
FIG. 5B is a topview of the optical component system without the light sensor array. A light barrier surrounds a plurality of ports and light sensors. A gap formed between light barriers associated with adjacent light sensors serves to keep the adjacent sensors electrically isolated.

The light barrier 58 can surround the sensor as shown in FIG. 5A and FIG. 5B. FIG. 5A is a cross section of an optical component system 49 having a light sensor array 50 coupled with an optical component 10. FIG. 5B is a topview of the optical component system 49 shown in FIG. 5A with the light sensor array 50 removed. The light barrier 58 surrounds a plurality of ports 20 and light sensors 52. When the light barrier 58 is electrically conducting, a gap formed between the light barrier 58 associated with adjacent light sensors 52 serves to keep the adjacent sensors electrically isolated.

In some instances, electrical communication between electronics and the light sensors 52 is achieved without a current passing through the light barrier 58 and/or through the bonding medium 66. For instance, the first array pads 54 can be positioned on the top of the light sensor array 50 and wire bonding can be employed to bond wires 60 to the first array pads 54. These wires 60 can be connected to the electronics or to first component pads 34 that are not positioned under the light sensor array 50. As a result, neither the first array pads 54 nor the first component pads 34 need be positioned between the optical component 10 and the light sensor array 50. When electrical communication between electronics and the light sensors 52 is achieved without a current passing through the light barrier 58 and/or through the bonding medium 66, neither the light barrier 58 nor the bonding medium 66 need be electrically conductive.

Figure 6A:
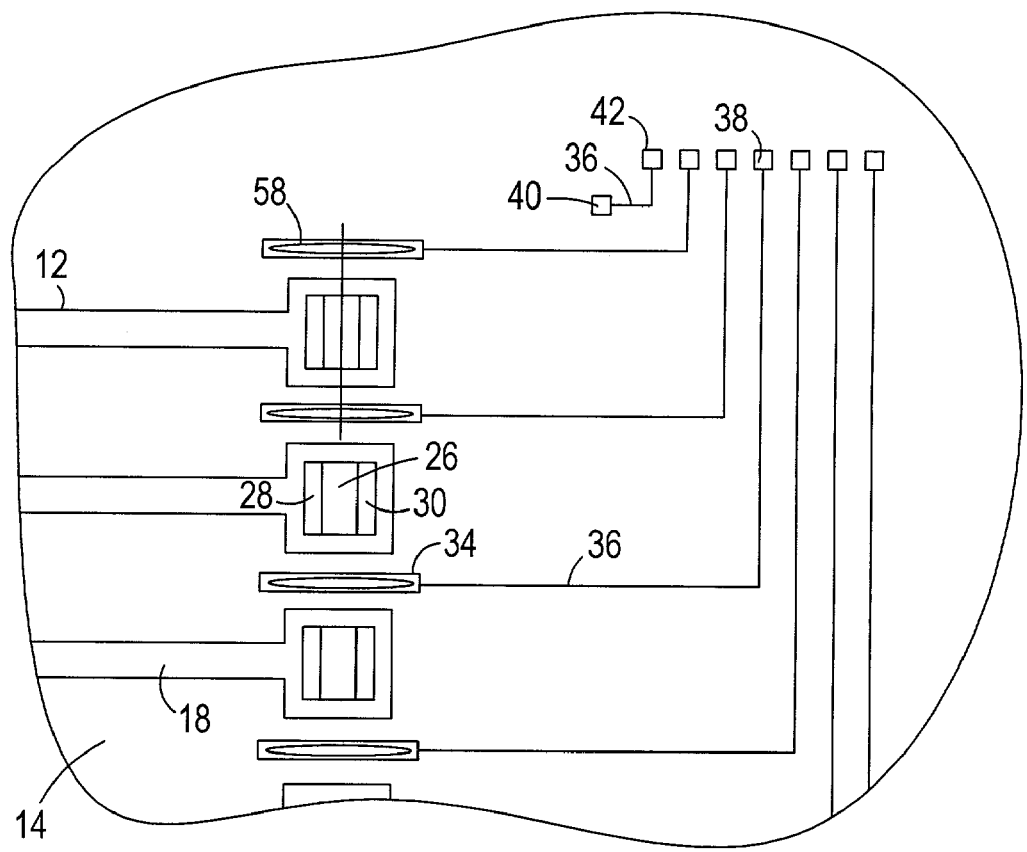
FIG. 6A through FIG. 6I illustrate a method of coupling an optical component with a light sensor array
Figure 6B:
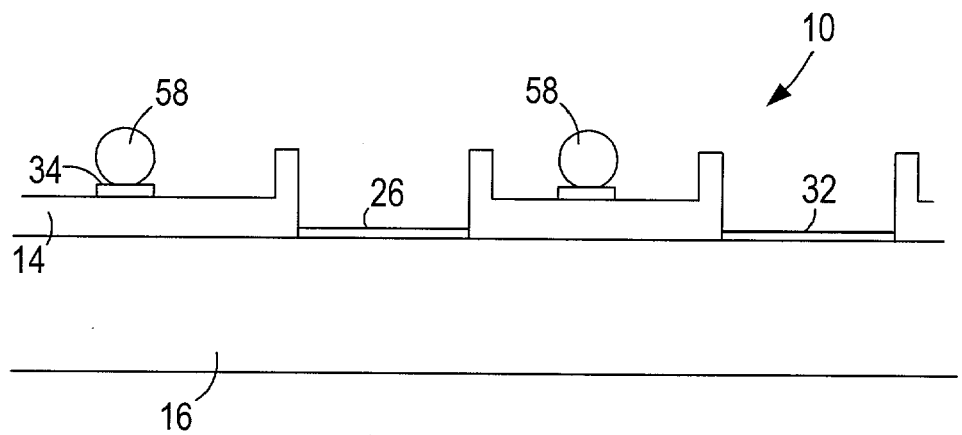

FIG. 6A through FIG. 6I illustrate a method of coupling an optical component 10 with a light sensor array 50. FIG. 6A and FIG. 6B illustrate a suitable optical component 10 for use with the optical component system 49. FIG. 6A is a topview of the optical component 10. FIG. 6B is a cross section of the optical component 10 taken along the line labeled A in FIG. 6A. A suitable method for constructing an optical component 10 having the illustrated waveguides 12 and ports 20 is taught in U.S. patent application Ser. No. 10/161,208, filed on May 31, 2002 and entitled "Waveguide 12 Tap Monitor." The first component pads 34, the second component pads 38, the first common component pad 40, the second common component pad 42 and the conductors 36 can be formed on the optical component 10 using integrated circuit fabrication technologies.

A light barrier 58 is positioned on a region of the optical component 10 between adjacent ports 20. A suitable light barrier 58 includes, but is not limited to, a metal. A metal such as gold can be formed on the optical component 10 as a gold line or a gold ball. Gold lines can be formed on the optical component 10 employing a gold wedge bonder. The light barrier 58 can be positioned on the first component pads 34 when the light barrier 58 is to provide electrical communication between the light sensor array 50 and the optical component 10.

Figure 6C:
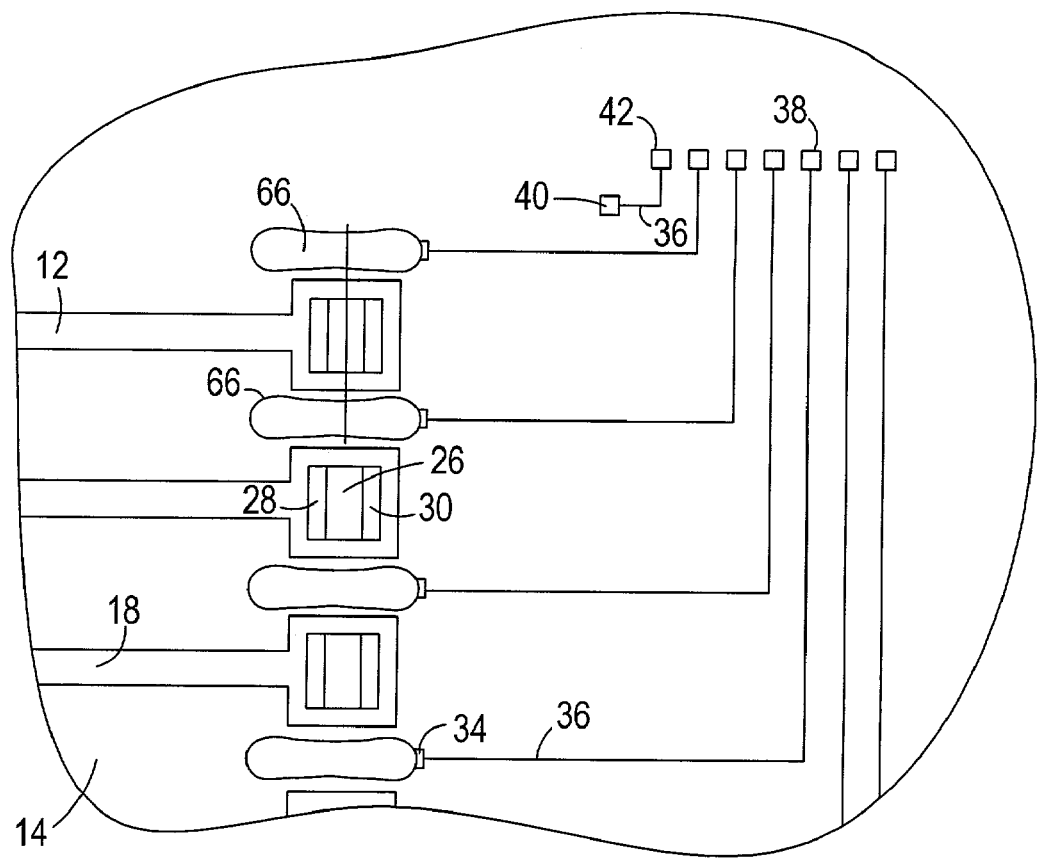
Figure 6D:
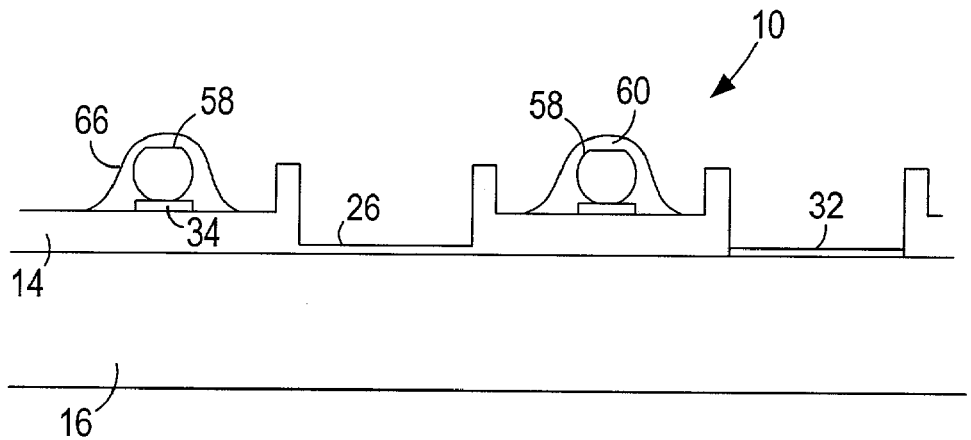

The light barrier 58 can be compressed to provide the optical component 10 shown in FIG. 6C and FIG. 6D. FIG. 6C is a topview of the optical component 10. FIG. 6D is a cross section of the optical component 10 taken along the line labeled A in FIG. 6A. Compression of the light barrier 58 can flatten out the top and the bottom of the metal line and improve the interface between the light barrier 58 and the optical component 10 or between the light barrier 58 and the light sensor array 50. A suitable method for compressing the light barrier 58 includes, but is not limited to, using a flip-chip bonder.

The liquid form of a bonding medium 66 is formed on the light barriers 58. Suitable boding media include, but are not limited to, electrically conducting epoxies such as ABLEBOND from Ablestik, Inc. and H2O from Epo-Tek, Inc. The liquid form of an epoxy can be deposited on the light barriers 58 employing an epoxy dispenser. The light barrier can prevent the liquid form of the bonding medium from running into the adjacent ports.

Figure 6E:
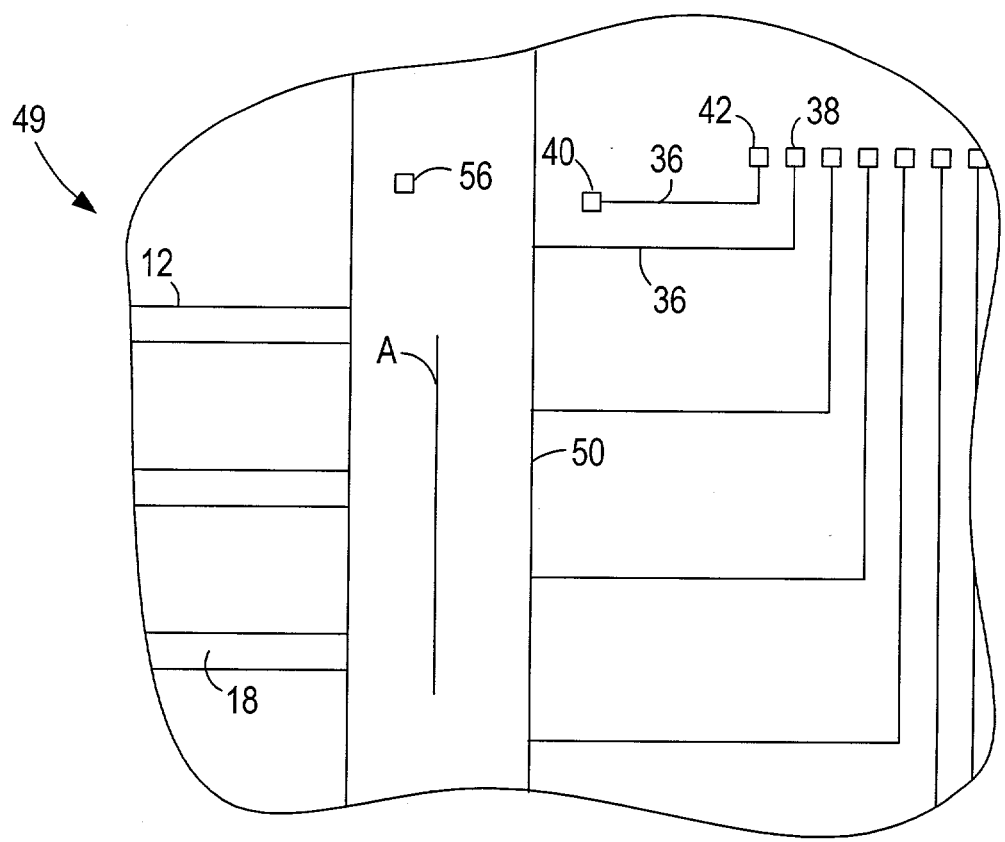
Figure 6F:
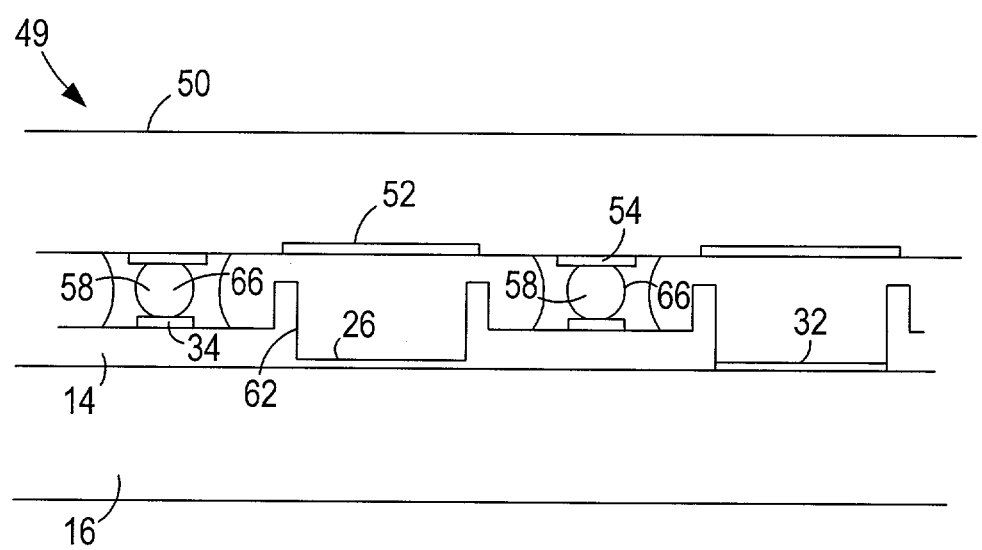

A light sensor array 50 is bonded to the optical component 10 to provide the optical component system 49 illustrated in FIG. 6E and FIG. 6F. FIG. 6E is a topview of the optical component system 49. FIG. 6F is a cross section of the optical component system 49 taken along the line labeled A in FIG. 6E. The light sensor array 50 is positioned on the optical component 10 such that the reach light sensor 52 is positioned to receive light signals from a particular port 20. When the bonding medium 66 is an epoxy, the epoxy can be cured to immobilize the light sensor array 50 relative to the optical component 10.

Figure 6G:
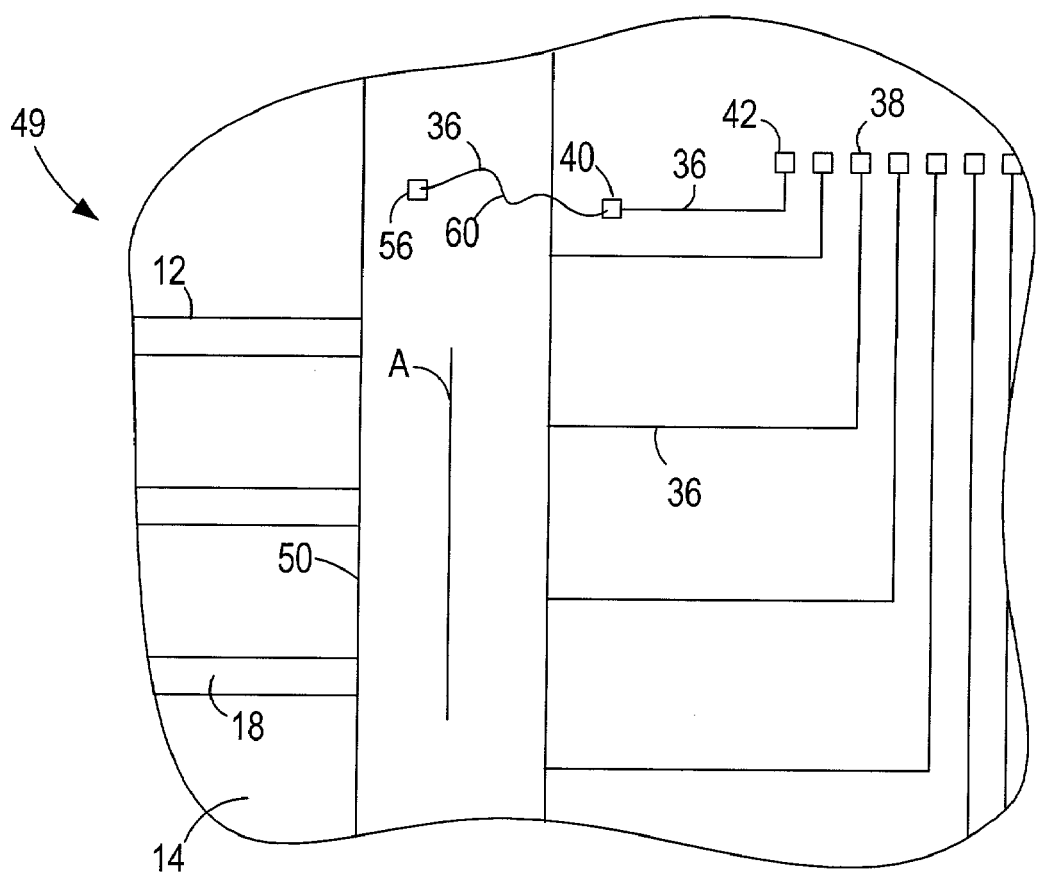
Figure 6H:
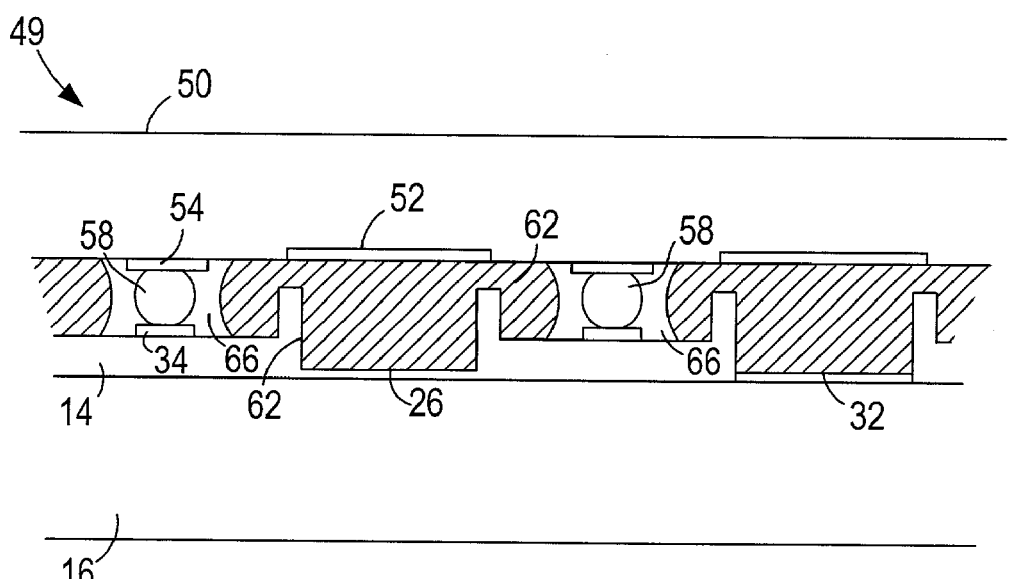

A second light transmitting medium 62 is formed between the light sensor array 50 and the optical component 10 to provide the optical component system 49 illustrated in FIG. 6G and FIG. 6H. FIG. 6G is a topview of the optical component system 49. FIG. 6H is a cross section of the optical component system 49 taken along the line labeled A in FIG. 6G. The second light transmitting medium 62 can be formed by employing a liquid medium precursor. A suitable liquid medium precursor can be converted into the second light transmitting medium 62. The liquid medium precursor can be transported into the region between the light sensor array 50 and the optical component 10. For instance, the liquid medium precursor can be positioned adjacent to an opening between the light sensor array 50 and the optical component 10 under conditions that cause the liquid medium precursor to be wicked into the region between the light sensor array 50 and the optical component 10. The liquid medium precursor can then be converted to the second light transmitting medium 62.

As noted above, a suitable liquid medium precursor can be converted from the liquid state into the second light transmitting medium 62. The liquid medium precursor can be the liquid state of the epoxy before the epoxy is cured. The liquid state of the epoxy can cured to convert the liquid medium precursor to the second light transmitting medium 62. A suitable liquid medium precursor for use with a silicon light transmitting medium includes, but is not limited to, OG146 from Epo-TEK, Inc., 310 EPOXY from Epo-TEK, Inc. or ADHESIVE 61 from Norland, Inc. The optical component system 49 can be preheated to a temperature sufficient to wick the liquid medium precursor into the region between the optical component 10 and the light sensor array 50. The temperature of the optical component system 49 can be further elevated for a period of time sufficient to cure the liquid medium precursor.

A wire 60 is bonded to the common array pad 56 and the first common component pad 40 so as to provide electrical communication between the common array pad 56 and the first common component pad 40. Wire bonding can be employed to bond the wire 60 to the common array pad 56 and the first common component pad 40.

Figure 6I:
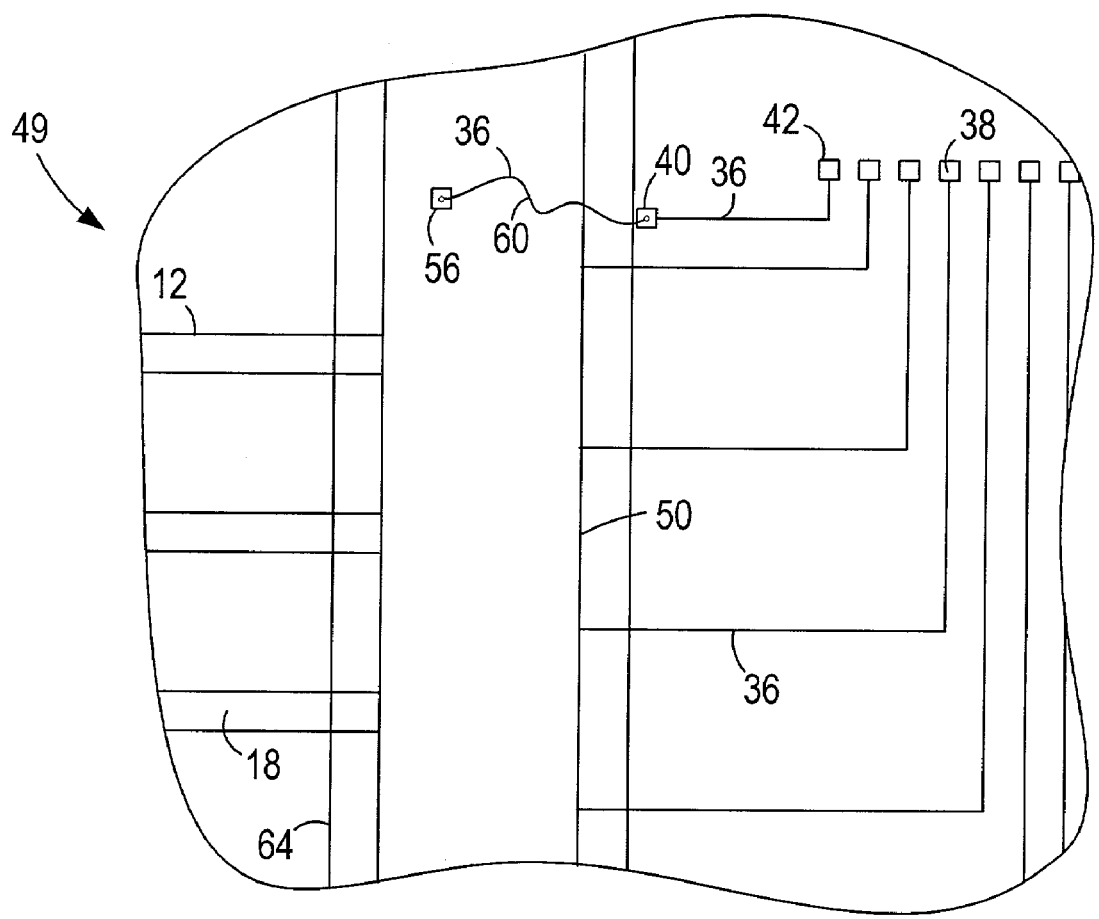

A sealing medium 64 is formed on the light sensor array 50 to provide the optical component system 49 illustrated in FIG. 6I. FIG. 6I is a topview of the optical component system 49. Suitable sealing media 64 include, but are not limited to, 832 ADHESIVE from MG Chemical, Inc., 832 ADHESIVE from MG Chemical, Inc., EP31 from Masterbond, Inc., TSE 397 from General Electric, Inc.

Although the optical component system is disclosed in the context of a light sensor array positioned over the optical component, the above principles can be applied to a light sensor array coupled to a side of an optical component. Accordingly, the ports can be waveguide facets positioned at the edge of the optical component.

Although the optical component is disclosed in the context of optical components having ridge waveguides, the principles of the present invention can be applied to optical components having other waveguide types. Suitable waveguide types include, but are not limited to, buried channel waveguides and strip waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
    an optical component having a plurality of waveguides that each has a length, the waveguides being positioned on a substrate such that each waveguide is immobilized relative to the substrate along the length of the waveguide, the optical component also having ports through which light signals guided through the waveguides exit the optical component;
    a light sensor array including a plurality of light sensors, different light sensors configured to receive light signals from different waveguides, each waveguide is associated with the light sensor configured to receive the light signals from that waveguide;
    a light transmitting medium between the optical component and the light sensor array, the light transmitting medium positioned such that the light signals travel through the light transmitting medium when traveling from the waveguides to the light sensors; and
    a light barrier positioned between an electrical contact pad on the optical component and an electrical contact pad on the light sensor array,
        the electrical contact pad on the optical component being positioned over a region of the optical component that is between ports and the electrical contact pad on the light sensor array being positioned over a region of the light sensor array that is between light sensors,
        the light barrier configured to prevent a first light signal traveling through the light transmitting medium from being received at one or more of the light sensors that are not associated with the waveguide from which the first light signal exited.

2. The system of claim 1, wherein the light barrier is electrically conductive.

3. The system of claim 1, wherein the light barrier includes a metal.

4. The system of claim 3, wherein the metal includes gold.

5. The system of claim 1, wherein the light barrier is positioned so as to surround an optical path that the first light signal travels from the waveguide from which the first light signal exited to the associated light sensor.

6. The system of claim 1, wherein a bonding medium is positioned adjacent to the light barrier, the bonding medium bonding the optical component to the light sensor array.

7. The system of claim 6, wherein the bonding medium is electrically conductive.

8. The system of claim 6, wherein the bonding medium is electrically conductive.

9. The system of claim 1, wherein the light sensor array is positioned over the optical component such that the ports are between the substrate and the light sensor array.

10. The system of claim 1, wherein the ports are configured to re-direct the light signals from the waveguides to a region over the optical component such that the waveguides are positioned between the substrate and the region over the optical component.

11. The system of claim 1, further comprising:
    a bonding medium bonding the optical component to the light sensor array; and
    a medium encapsulating the light sensor array, the medium being different from the bonding medium.

12. The system of claim 1, wherein the light barrier is one of a plurality of light barriers between the optical component and the light sensor array, the light barriers being configured to prevent the light signals traveling through the light transmitting medium from being received at the light sensors that are not associated with the waveguide from which each light signal exited.

13. The system of claim 1, wherein the light barrier extends from a region of the optical component between ports to a region of the light sensor array between light sensors.

14. The system of claim 1, wherein the light barrier is electrically conducting and provides electrical communication between an electrical contact pad on the optical component and an electrical contact pad on the light sensor array.

15. The system of claim 14, wherein the electrical contact pad on the optical component is between ports.

16. The system of claim 14, wherein the electrical contact pad on the optical component is between ports and the electrical contact pad on the light sensor array is between light sensors.

17. The system of claim 1, wherein the waveguides are arranged such that lengths of the waveguides define a plane and the ports are configured to re-direct the light signals traveling along the waveguides out of the plane.

18. The system of claim 1, wherein the waveguides are ridge waveguides that are each defined by a ridge of a medium extending from a slab of the medium such that each ridge extends from the same slab and such that the medium extends continuously from the slab into each ridge.

19. The system of claim 1, wherein the light transmitting medium extends continuously from the waveguides to the light sensors such that the light signals travel exclusively through the light transmitting medium when traveling from the waveguides to the light sensors.

20. The system of claim 1, wherein the light sensor array is immobilized relative to the optical component.

21. The system of claim 1, wherein:
the light barrier is electrically conductive;
the light barrier is positioned so as to surround an optical path that the first light signal travels from the waveguide from which the first light signal exited to the associated light sensor;
a bonding medium is positioned adjacent to the light barrier, the bonding medium bonding the optical component to the light sensor array and being different from the light transmitting medium;
the light sensor array is positioned over the optical component such that the ports are between the substrate and the light sensor array; and
the ports are configured to re-direct the light signals from the waveguides to a region over the optical component such that the waveguides are positioned between the substrate and the region over the optical component.

22. The system of claim 21, wherein the bonding medium is electrically conductive.

23. The system of claim 1, wherein the light barrier contacts the optical component and also contacts the light sensor array.

24. An optical system, comprising:
an optical component having a plurality of waveguides that each has a length, the waveguide positioned on a substrate such that each waveguide is immobilized relative to the substrate along the length of the waveguide, the optical component also having ports through which light signals guided through the waveguides exit the optical component;
a light sensor array including a plurality of light sensors, the array being coupled to the optical component such that different light sensors receive light signals that exit the optical component through different ports;
a light transmitting medium between the optical component and the light sensor array, the light transmitting medium positioned such that the light signals travel through the light transmitting medium when traveling from the waveguides to the light sensors; and
a light barrier between an electrical contact pad on the optical component and an electrical contact pad on the light sensor array,
the electrical contact pad on the optical component being positioned over a region of the optical component that is between ports and the electrical contact pad on the light sensor array being positioned over a region of the light sensor array that is between light sensors,
the light barrier also being positioned between different regions of the light transmitting medium, and
the light barrier also being positioned over a region of the optical component that is located between adjacent ports.

25. The system of claim 24, wherein the light barrier is electrically conductive.

26. The system of claim 24, wherein the light barrier includes a metal.

27. The system of claim 24, wherein a bonding medium is positioned adjacent to the light barrier, the bonding medium bonding the optical component to the light sensor array.

28. The system of claim 27, wherein the bonding medium is electrically conductive.

29. The system of claim 24, wherein the light sensor array is positioned over the optical component such that the ports are between the substrate and the light sensor array.

30. The system of claim 24, wherein the ports are configured to re-direct the light signals from the waveguides to a region over the optical component such that the waveguides are positioned between the substrate and the region over the optical component.

31. The system of claim 24, wherein the light barrier is one of a plurality of light barriers between the optical component and the light sensor array, more than one of the light barriers positioned over a region of the optical component between adjacent ports and also positioned between different regions of the light transmitting medium.

32. The system of claim 24, wherein the light barrier contacts the optical component and also contacts the light sensor array.

33. A method of forming an optical component system, comprising:
obtaining an optical component having a plurality of waveguides that each has a length, the waveguides being positioned on a substrate such that each waveguide is immobilized relative to the substrate along the length of the waveguide, the optical component also having ports through which light signals guided through the waveguides exit the optical component;
obtaining a light sensor array including a plurality of light sensors; and
bonding the light sensor array and the optical component such that different light sensors are configured to receive light signals from different waveguides, each waveguide being associated with the light sensor that receives the light signals from that waveguide,
wherein the light sensor array is bonded to the optical component such that a light transmitting medium is positioned between the optical component and the light sensor array, the light transmitting medium positioned such that the light signals travel through the light transmitting medium when traveling from the waveguides to the light sensors, and
wherein the light sensor array is bonded to the optical component such that a light barrier is positioned between an electrical contact pad on the optical component and an electrical contact pad on the light sensor array,
the electrical contact pad on the optical component being positioned over a region of the optical component that is between ports and the electrical contact pad on the light sensor array being positioned over a region of the light sensor array that is between light sensors, and
the light barrier configured to prevent a first light signal traveling through the light transmitting medium from being received at one or more of the light sensors that are not associated with the waveguide from which the first light signal exited.

34. The method of claim 33, wherein the light sensor array and the optical component are bonded such that the light barrier is between an electrical contact pad on the optical component and an electrical contact pad on the light sensor array.

35. The method of claim 33, further comprising:
positioning the light barrier on a region of the optical component between adjacent ports before bonding the light sensor array and the optical component.

36. The method of claim 35, further comprising:
compressing the light barrier before bonding the light sensor array and the optical component.

37. The method of claim 36, wherein bonding the light sensor array and the optical component includes depositing a liquid bonding medium precursor on the light barrier, the liquid bonding medium being convertible to a solid bonding medium.

38. The method of claim 37, wherein the solid bonding medium is electrically conductive.

39. The method of claim 33, further comprising:
forming a solid medium between the light sensor array and the optical component after bonding the light sensor array and the optical component.

40. The method of claim 33, further comprising:
encapsulating at least a portion of the light sensor array in a sealing medium after bonding the light sensor array and the optical component.

41. The method of claim 33, wherein the light barrier contacts the optical component and also contacts the light sensor array.

* * * * *